United States Patent
Myers et al.

(10) Patent No.: US 10,228,696 B2
(45) Date of Patent: Mar. 12, 2019

(54) WIND DETECTION SYSTEMS AND METHODS

(71) Applicant: Ford Global Technologies, LLC, Dearborn, MI (US)

(72) Inventors: Scott Vincent Myers, Camarillo, CA (US); Parsa Mahmoudieh, Vallejo, CA (US); Ashok E. Rodrigues, Farmington Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/416,877

(22) Filed: Jan. 26, 2017

(65) Prior Publication Data

US 2018/0210447 A1     Jul. 26, 2018

(51) Int. Cl.
| | |
|---|---|
| *G01C 22/00* | (2006.01) |
| *G05D 1/00* | (2006.01) |
| *G05D 1/02* | (2006.01) |
| *B60W 50/14* | (2012.01) |
| *G08G 1/0968* | (2006.01) |
| *G08G 1/00* | (2006.01) |
| *G01P 13/04* | (2006.01) |

(52) U.S. Cl.
CPC .......... *G05D 1/0214* (2013.01); *B60W 50/14* (2013.01); *G05D 1/0088* (2013.01); *G05D 1/0231* (2013.01); *G05D 1/0246* (2013.01); *G05D 1/0257* (2013.01); *G08G 1/096855* (2013.01); *B60W 2050/143* (2013.01); *B60W 2050/146* (2013.01); *B60W 2550/12* (2013.01); *G01P 13/045* (2013.01)

(58) Field of Classification Search
CPC .. G05D 1/0214; G05D 1/0088; G05D 1/0231; G05D 1/0246; G05D 1/0257; B60W 50/14; G01P 5/00; G01P 13/02; B62D 37/02
USPC ............................................. 701/23; 340/901
See application file for complete search history.

(56) References Cited

U.S. PATENT DOCUMENTS

| | | | |
|---|---|---|---|
| 5,872,621 A | 2/1999 | Wilkerson | |
| 7,471,995 B1 * | 12/2008 | Robinson | G01C 23/00 340/901 |
| 8,983,726 B2 | 3/2015 | Lee | |
| 2014/0300888 A1 | 10/2014 | Duffey | |

(Continued)

FOREIGN PATENT DOCUMENTS

| | | |
|---|---|---|
| CN | 204116380 U | 1/2015 |
| GB | 2275032 | 8/1994 |

(Continued)

OTHER PUBLICATIONS

English Translation for KR-20150051551-A.*

*Primary Examiner* — Mahmoud S Ismail
(74) *Attorney, Agent, or Firm* — David R. Stevens; Stevens Law Group

(57) ABSTRACT

Example wind detection systems and methods are described. In one implementation, a method receives data from a vehicle-mounted sensor and determines whether airborne particles are identified in the received data. If airborne particles are identified in the received data, the method determines a wind speed and a wind direction based on movement of the airborne particles and determines a best action to avoid or mitigate the impact of the wind.

7 Claims, 5 Drawing Sheets

(56) References Cited

U.S. PATENT DOCUMENTS

2016/0290912 A1* 10/2016 Kent ................. G01N 15/1434
2017/0334444 A1   11/2017 Hawes

FOREIGN PATENT DOCUMENTS

| KR | 100774737     |   | 11/2007 |            |
|----|---------------|---|---------|------------|
| KR | 20150051551 A | * | 5/2015  |            |
| TW | 201013188 A   |   | 4/2010  |            |
| WO | WO2013/112243 |   | 8/2013  |            |
| WO | WO-2014133424 A1 | * | 9/2014 | ............. B62D 37/02 |

\* cited by examiner

WIND DETECTION SYSTEMS AND METHODS

TECHNICAL FIELD

The present disclosure relates to vehicular systems and, more particularly, to systems and methods that detect dangerous wind conditions near a vehicle.

BACKGROUND

Automobiles and other vehicles provide a significant portion of transportation for commercial, government, and private entities. Vehicles, such as autonomous vehicles, drive on roadways that may experience structural decay and other problems that put vehicles, and their occupants, at risk. In some situations, a vehicle may be at risk in driving situations where high wind conditions are present, such as cross-winds and wind shear conditions. For example, a high cross-wind or wind shear can push a vehicle off the road or into another vehicle in an adjacent lane, thereby causing an accident. In particular situations, high wind conditions may cause a vehicle to overturn on a roadway. Early detection of high wind conditions gives the vehicle time to take action to avoid or mitigate the impact of the wind.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
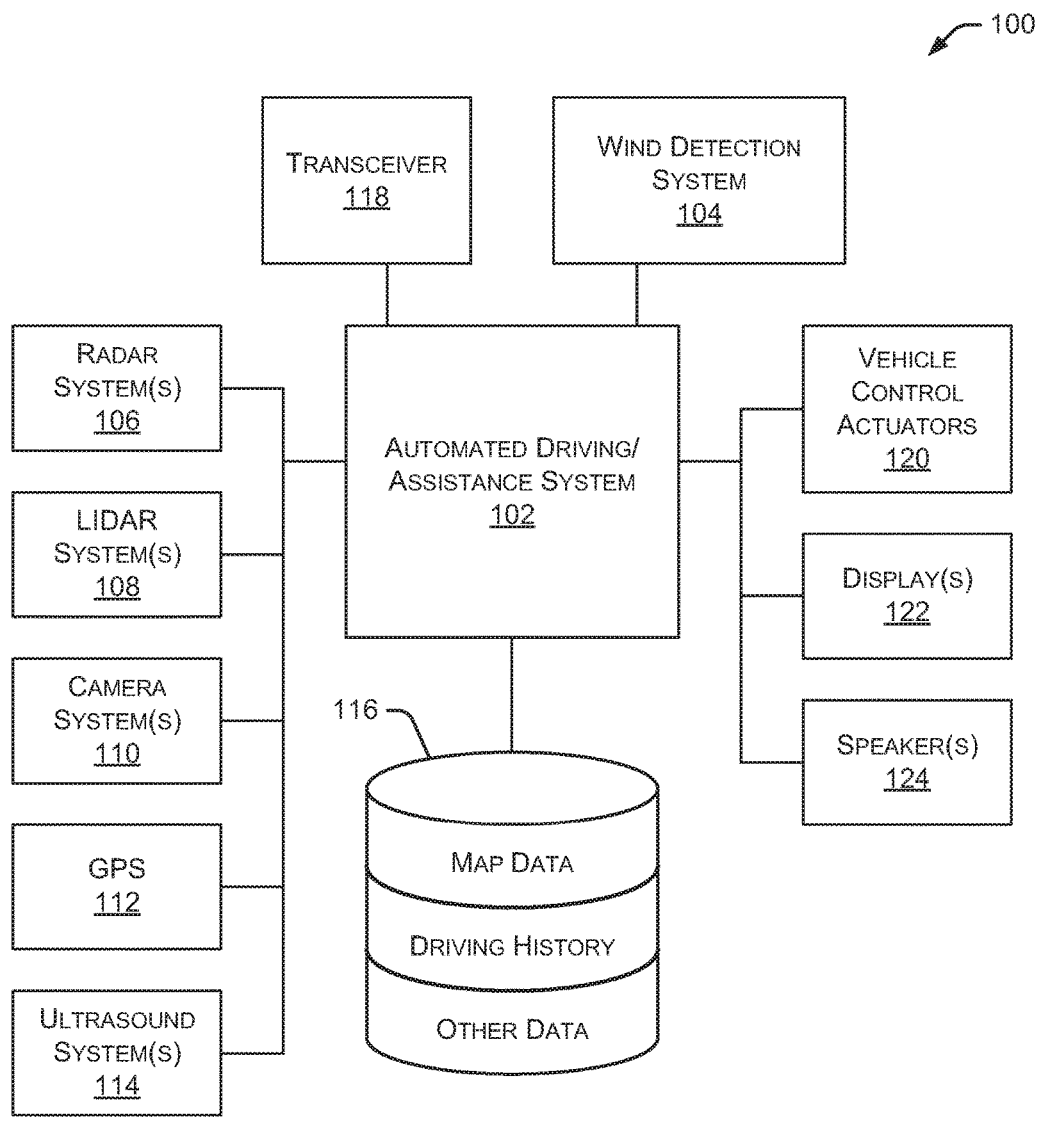
FIG. 1 is a block diagram illustrating an embodiment of a vehicle control system that includes a wind detection system.

In the following disclosure, reference is made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter is described in language specific to structural features and/or methodological acts, it is to be understood that the subject matter defined in the appended claims is not necessarily limited to the described features or acts described herein. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed herein may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure are directed to computer program products comprising such logic (e.g., in the form of software) stored on any computer useable medium. Such software, when executed in one or more data processing devices, causes a device to operate as described herein.

FIG. 1 is a block diagram illustrating an embodiment of a vehicle control system 100 within a vehicle that includes a wind detection system 104. An automated driving/assistance system 102 may be used to automate or control operation of a vehicle or to provide assistance to a human driver. For example, the automated driving/assistance system 102 may control one or more of braking, steering, seat belt tension, acceleration, lights, alerts, driver notifications, radio, vehicle locks, or any other auxiliary systems of the vehicle. In another example, the automated driving/assistance system 102 may not be able to provide any control of the driving (e.g., steering, acceleration, or braking), but may provide notifications and alerts to assist a human driver in driving safely. Vehicle control system 100 includes wind detection system 104 that interacts with various components in the vehicle control system to detect and respond to dangerous wind situations. In one embodiment, wind detection system 104 detects a dangerous wind condition near the vehicle (e.g., a high cross-wind or wind shear ahead of the vehicle) and adjusts one or more vehicle operations to avoid or mitigate the impact of the high winds, such as slowing the vehicle or maneuvering the vehicle near a natural or man-made windbreak. Although wind detection system 104 is shown as a separate component in FIG. 1, in alternate embodiments, wind detection system 104 may be incorporated into automated driving/assistance system 102 or any other vehicle component.

The vehicle control system 100 also includes one or more sensor systems/devices for detecting a presence of nearby objects or determining a location of a parent vehicle (e.g., a vehicle that includes the vehicle control system 100). For example, the vehicle control system 100 may include radar systems 106, one or more LIDAR systems 108, one or more camera systems 110, a global positioning system (GPS) 112, and/or ultrasound systems 114. The one or more camera systems 110 may include a rear-facing camera mounted to the vehicle (e.g., a rear portion of the vehicle), a front-facing camera, and a side-facing camera. Camera systems 110 may also include one or more interior cameras that capture images of passengers and other objects inside the vehicle. The vehicle control system 100 may include a data store 116 for storing relevant or useful data for navigation and safety, such as map data, driving history, or other data. The vehicle control system 100 may also include a transceiver 118 for wireless communication with a mobile or wireless network, other vehicles, infrastructure, or any other communication system.

The vehicle control system 100 may include vehicle control actuators 120 to control various aspects of the driving of the vehicle such as electric motors, switches or other actuators, to control braking, acceleration, steering, seat belt tension, door locks, or the like. The vehicle control system 100 may also include one or more displays 122, speakers 124, or other devices so that notifications to a human driver or passenger may be provided. A display 122 may include a heads-up display, dashboard display or indicator, a display screen, or any other visual indicator, which may be seen by a driver or passenger of a vehicle. The speakers 124 may include one or more speakers of a sound system of a vehicle or may include a speaker dedicated to driver or passenger notification.

It will be appreciated that the embodiment of FIG. 1 is given by way of example only. Other embodiments may include fewer or additional components without departing from the scope of the disclosure. Additionally, illustrated components may be combined or included within other components without limitation.

In one embodiment, the automated driving/assistance system 102 is configured to control driving or navigation of a parent vehicle. For example, the automated driving/assistance system 102 may control the vehicle control actuators 120 to drive a path on a road, parking lot, driveway or other location. For example, the automated driving/assistance system 102 may determine a path based on information or perception data provided by any of the components 106-118. A path may also be determined based on a route that maneuvers the vehicle to avoid or mitigate the impact of high winds near the vehicle. The sensor systems/devices 106-110 and 114 may be used to obtain real-time sensor data so that the automated driving/assistance system 102 can assist a driver or drive a vehicle in real-time.

Figure 2:
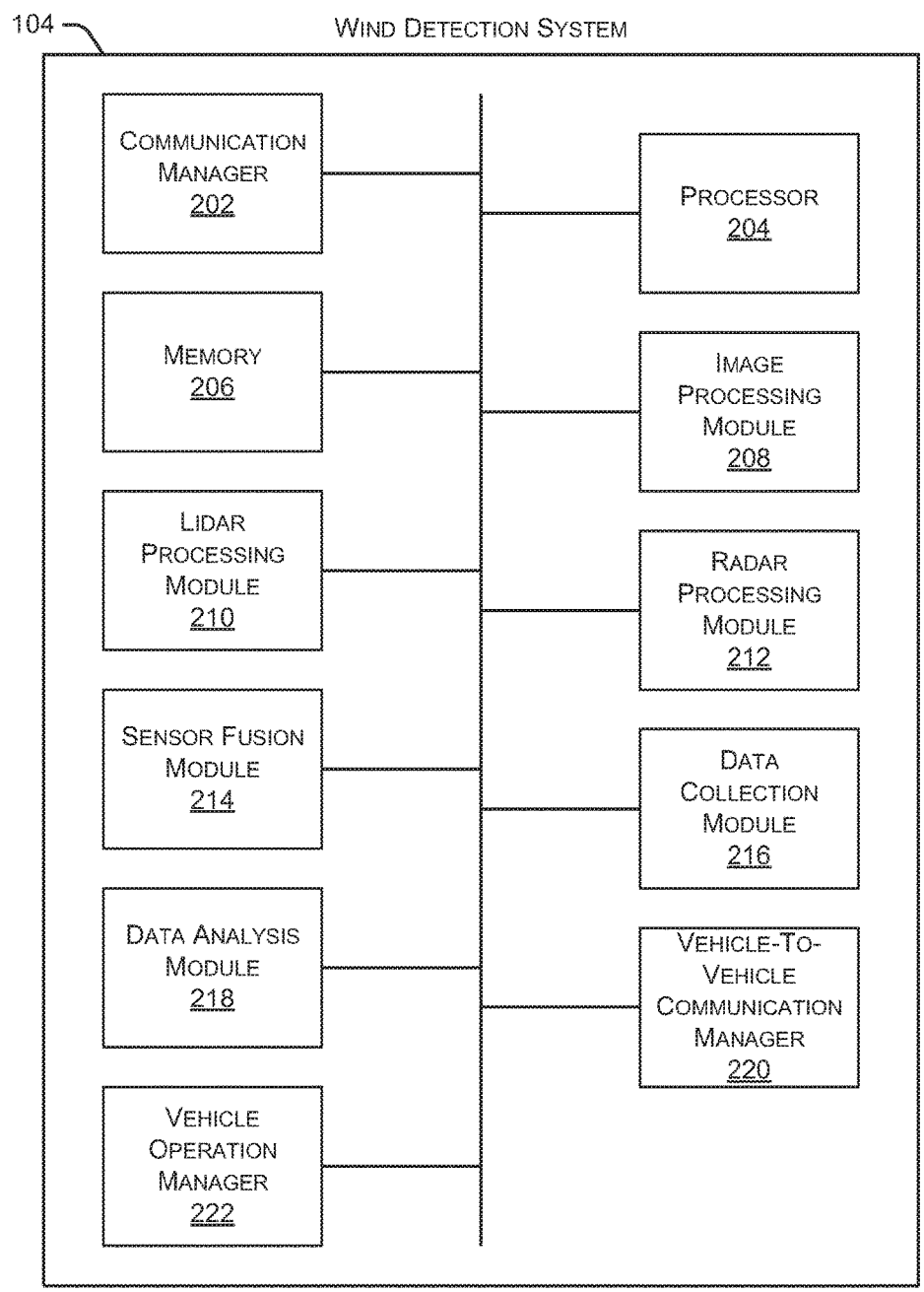
FIG. 2 is a block diagram illustrating an embodiment of a wind detection system.

FIG. 2 is a block diagram illustrating an embodiment of wind detection system 104. As shown in FIG. 2, wind detection system 104 includes a communication manager 202, a processor 204, and a memory 206. Communication manager 202 allows wind detection system 104 to communicate with other systems, such as automated driving/assistance system 102. Processor 204 executes various instructions to implement the functionality provided by wind detection system 104 as discussed herein. Memory 206 stores these instructions as well as other data used by processor 204 and other modules and components contained in wind detection system 104.

Additionally, wind detection system 104 includes an image processing module 208 that receives image data from one or more camera systems 110 and identifies, for example, other vehicles moving on a roadway or airborne particles moving in the wind. In some embodiments, image processing module 208 includes an airborne particle detection algorithm that identifies a direction and speed of airborne particles near the vehicle. A LIDAR processing module 210 receives LIDAR data from one or more LIDAR systems 108 and identifies, for example, airborne particles. In some embodiments, the airborne particle detection algorithm detects the speed and direction of airborne particles based on LIDAR data. Additionally, a radar processing module 212 receives radar data from one or more radar systems 106 to identify, for example, airborne particles near the vehicle. In some embodiments, the airborne particle detection algorithm uses the radar data to detect the speed and direction of airborne particles.

Wind detection system 104 also includes a sensor fusion module 214 that fuses data from multiple sensors, cameras, and data sources, as discussed herein. For example, sensor fusion module 214 may fuse data from one or more cameras 110, radar systems 106, and LIDAR systems 108 to detect airborne particles and other indicators of high wind conditions near a vehicle. A data collection module 216 collects data from multiple sources, such as image processing module 208, LIDAR processing module 210, radar processing module 212, sensor fusion module 214, and other vehicle components, such as an accelerometer, gyroscope, and the like. The accelerometer and gyroscope information is useful, for example, to detect pitch and yaw movements that may be caused by high winds near the vehicle. Additionally, data collection module 216 may receive (or access) data from additional data sources, such as map data associated with an area near the vehicle's current geographic location, weather data in the current geographic location, and any other type of data from any data source. The map data is useful to identify, for example, upcoming roadway orientation, nearby windbreaks (both natural and man-made), and geographic areas that commonly experience high wind conditions. The weather data, for example, provides information about weather conditions near the vehicle that may include high wind conditions. Other data may include, for example, data from other vehicles or infrastructure systems that report high wind conditions in the area near the vehicle's current geographic location.

Wind detection system 104 further includes a data analysis module 218 that performs various operations on data received from any number of sensors and/or data sources to detect dangerous wind situations, as discussed herein. For example, data analysis module 218 can analyze one or more types of data from image processing module 208, LIDAR processing module 210, radar processing module 212, sensor fusion module 214, data collection module 216, or any other source of data. In some embodiments, dangerous wind situations are determined based on a wind speed, wind direction (e.g., substantially perpendicular to the vehicle's direction of travel), detected wind gusts or wind shear, and the like.

Additionally, wind detection system 104 includes a vehicle-to-vehicle communication manager 220 that allows multiple vehicles to communicate with one another. For example, a vehicle may communicate a dangerous wind condition to other nearby vehicles. In some embodiments, a vehicle can communicate dangerous wind conditions to an infrastructure system using a V2X (Vehicle-to-Infrastructure) communication system.

Wind detection system 104 also includes a vehicle operation manager 222 that manages the operation of a vehicle based on the detection of a dangerous wind condition. In some embodiments, the vehicle may be maneuvered to the side of the roadway and stopped to avoid driving through a severe cross-wind. In other embodiments, vehicle operation manager 222 generates recommendations for maneuvering the vehicle to find a natural or man-made windbreak. In other situations, vehicle operation manager 222 may maneuver the vehicle so it is facing the wind, thereby reducing the likelihood of a vehicle rolling over due to a severe crosswind. Vehicle operation manager 222 may cause the vehicle to resume normal driving activities after the dangerous wind conditions subside.

Figure 3:
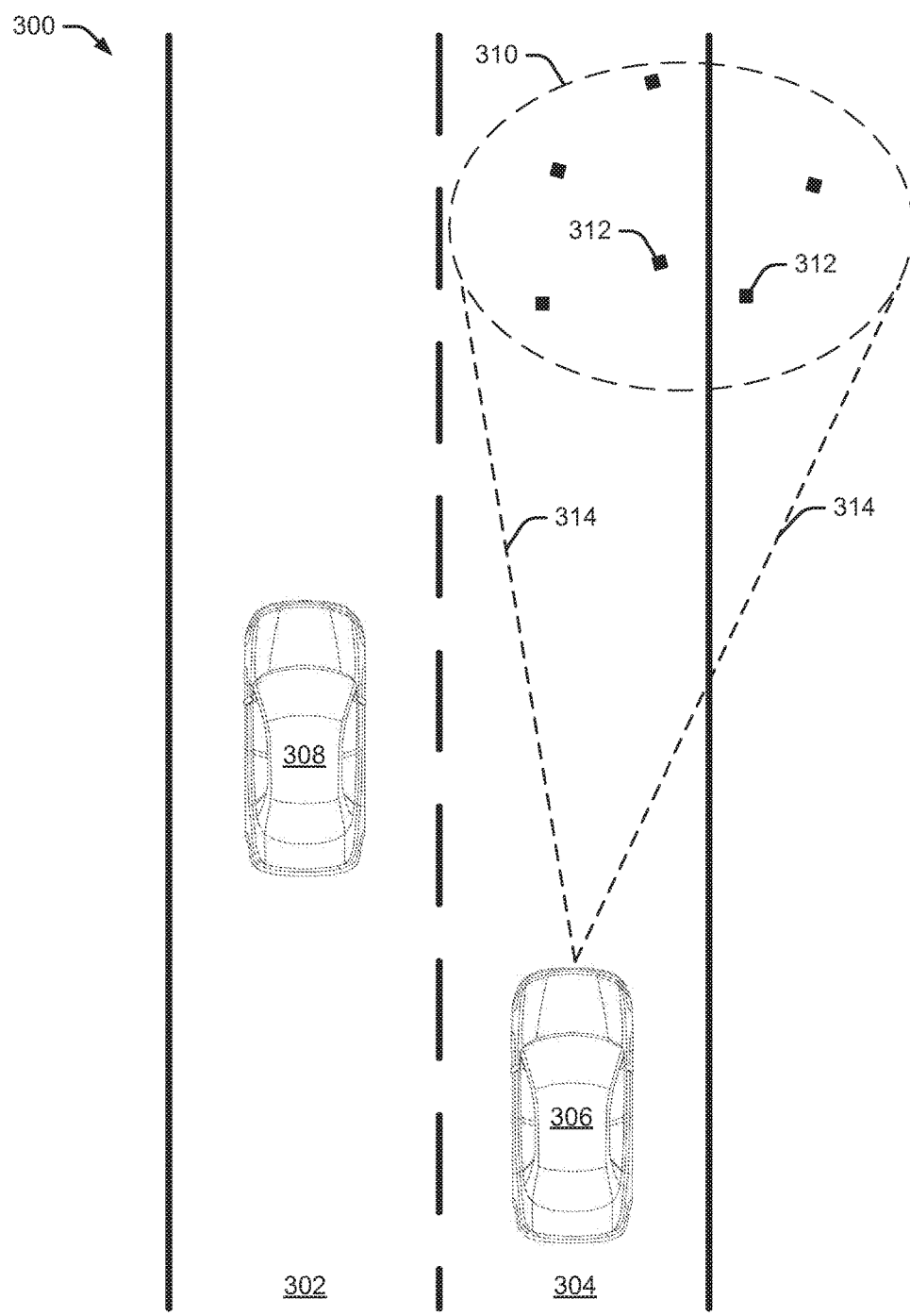
FIG. 3 illustrates an embodiment of a roadway with multiple vehicles traveling in the same direction.

FIG. 3 illustrates an embodiment of a roadway 300 with multiple vehicles traveling in the same direction. In the example of FIG. 3, roadway 300 has two lanes 302 and 304 with traffic moving in the same direction. Two vehicles 306 and 308 are driving on roadway 300. Vehicle 306 is driving in lane 304 and vehicle 308 is driving in lane 302. As shown in FIG. 3, an area 310 ahead of vehicle 306 includes multiple airborne particles 312. These airborne particles 312 can be any size and have any shape. Further, area 310 can have any number of airborne particles 312. Example airborne particles 312 include dirt particles, vegetation particles, trash particles, small objects, and any other item or particle that may be blown or moved by wind. As discussed herein, vehicle 306 has one or more sensors that can detect airborne particles. In some embodiments, a LIDAR sensor mounted to vehicle 306 receives data (indicated by broken lines 314) associated with airborne particles 312. The received data allows wind detection system 104 to determine a wind speed and wind direction based on the movement of airborne particles 312 over time. As discussed herein, the wind speed and wind direction is used to identify dangerous wind conditions that may negatively impact the vehicle.

Figure 4:
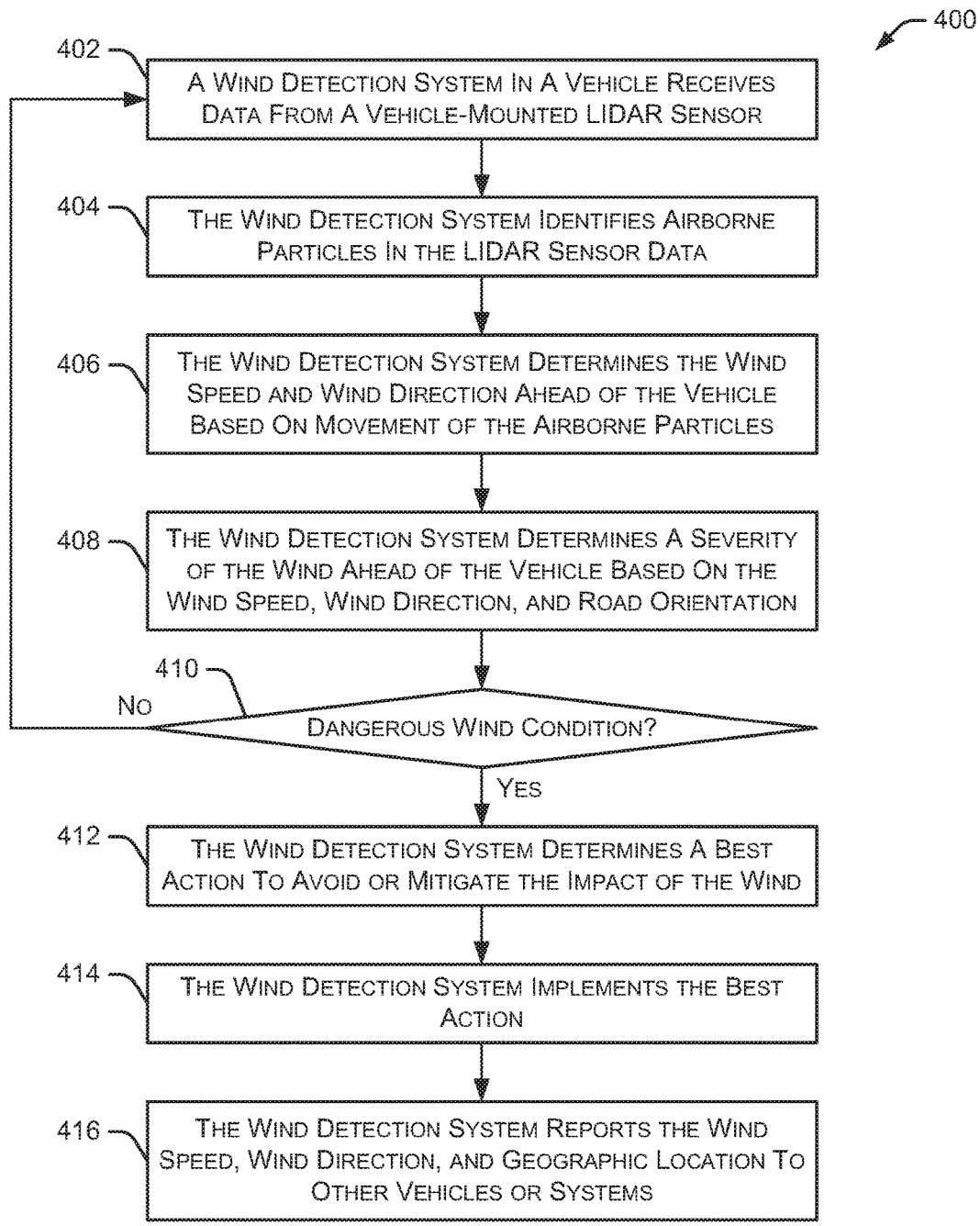
FIG. 4 illustrates an embodiment of a method for detecting dangerous wind conditions.

FIG. 4 illustrates an embodiment of a method 400 for detecting dangerous wind conditions. Initially, a wind detection system in a vehicle receives 402 data from a vehicle-mounted LIDAR system. The wind detection system identifies 404 airborne particles in the LIDAR system data. Based on the movement of the airborne particles over time, the wind detection system determines 406 the wind speed and the wind direction ahead of the vehicle (i.e., the area that the vehicle is driving toward). Based on the wind speed and the wind direction ahead of the vehicle, the wind detection system determines 408 a severity of the wind conditions. The severity of the wind conditions can be further based on the type of vehicle (e.g., how susceptible the vehicle is to cross-winds or wind shear) and the angle of the wind with respect to the direction the vehicle is traveling. For example, a wind direction that is perpendicular to the vehicle's direction of travel is more likely to cause a vehicle rollover or push the vehicle into a different lane. The severity of the wind conditions may be ranked on a numeric scale, such as 0-10, where "0" represents no wind and "10" represents an extremely dangerous wind condition.

In some embodiments, the ranking of the severity of the wind conditions considers movement of other vehicles caused by high winds, detection of accidents or vehicles that have rolled or overturned, weather reports of high winds, notifications from other vehicles of high wind situations, and the like.

Method 400 continues by determining 410 whether the wind condition is dangerous (e.g., exceeds a threshold value or threshold severity ranking). If the wind condition is not determined 410 to be dangerous, method 400 continues receiving data to monitor the wind situation ahead of the vehicle. If the wind condition is determined 410 to be dangerous, the wind detection system determines 412 a best action to avoid or mitigate the impact of the wind. For example, the best action may include one or more of: reducing the speed of the vehicle, parking the vehicle near a natural windbreak, maneuvering the vehicle close to a man-made windbreak, positioning the vehicle to face the wind (or point the rear of the vehicle into the wind), and the like.

In some embodiments, the wind detection system may use a vehicle's electronic limited slip differential to counteract undesirable yaw rates caused by cross-winds. Additionally, the wind detection system may use friction brakes to counteract the yaw rates based on an existing electronic stability control system. For example, the wind detection system may be configured to activate the vehicle's electronic limited slip differential at a first yaw threshold and activate the friction brakes at a second yaw threshold, where the second yaw threshold is greater than the first yaw threshold. In particular implementations, the wind detection system may use various data, as discussed herein, to engage the vehicle's electronic limited slip differential in anticipation of encountering cross-winds that will likely cause undesirable yaw rates. In some implementations, the friction brakes can be used independently from the electronic limited slip differential to counteract undesirable yaw rates caused by cross-winds.

In other embodiments, the wind detection system may use a vehicle's AWD (all-wheel drive) system to help counteract undesirable yaw rates caused by cross-winds. For example, the wind detection system may cause a vehicle control actuator to apply torque to the secondary axle of an on-demand AWD system. Additionally, the wind detection system may connect the secondary driveline (if presently unconnected) in an AWD system having a fast-acting connect/disconnect system.

The wind detection system then implements 414 the best action and reports 416 the wind speed, wind direction, and geographic location to other vehicles or systems (e.g., using V2V or V2X communication systems). Additionally, the wind detection system may generate audible and/or visual warnings to the occupants of the vehicle regarding the dangerous wind condition. Further, the wind detection system may generate audible and/or visual driving instructions to maneuver the vehicle using the best action to avoid or mitigate the impact of the wind.

Figure 5:
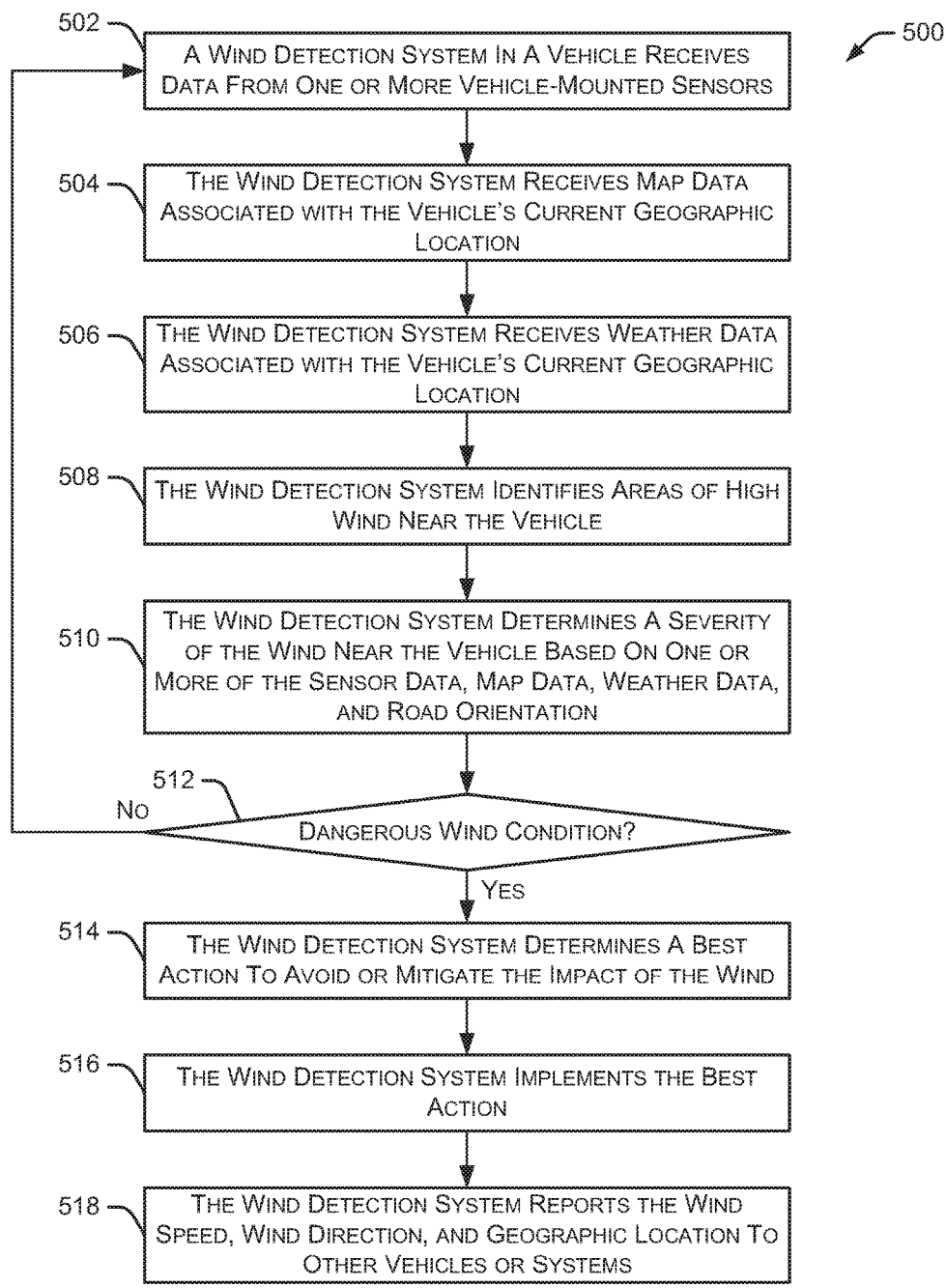
FIG. 5 illustrates another embodiment of a method for detecting dangerous wind conditions.

FIG. 5 illustrates another embodiment of a method 500 for detecting dangerous wind conditions. Initially, a wind detection system receives 502 data from one or more vehicle-mounted sensors, such as LIDAR sensors, radar sensors, camera sensors, ultrasound sensors, and the like. The wind detection system also receives 504 map data associated with the vehicle's current geographic location. This map data provides information such as the roadway orientation ahead of the vehicle, locations of natural or man-made windbreaks, areas of known high wind conditions, and the like. The map data can be accessed from the vehicle's own map information (e.g., as part of the vehicle's navigation system) or from an external map data source. The wind detection system also receives 506 weather data associated with the vehicle's current geographic location. The weather data may be received from one or more weather sources, weather tracking systems, and the like. Based on the various data received (or accessed) discussed above, the wind detection system identifies 508 areas of high wind near the vehicle.

Method 500 continues as the wind detection system determines 510 a severity of the wind near the vehicle based, for example, on one or more of the sensor data, map data, weather data, and road orientation. If method 500 determines at 512 that a dangerous wind condition does not exist, the method continues monitoring the area ahead of the vehicle.

If method 500 determines at 512 that a dangerous wind condition exists, the wind detection system determines 514 a best action to avoid or mitigate the impact of the wind. As discussed herein, the best action may include one or more of: reducing the speed of the vehicle, parking the vehicle near a natural windbreak, maneuvering the vehicle close to a man-made windbreak, positioning the vehicle to face the wind, and the like. The wind detection system then implements 516 the best action and reports 518 the wind speed, wind direction, and geographic location to other vehicles or systems (e.g., using V2V or V2X communication systems). Additionally, the wind detection system may generate audible and/or visual warnings to the occupants of the vehicle regarding the dangerous wind condition. Further, the wind detection system may generate audible and/or visual driving instructions to maneuver the vehicle using the best action to avoid or mitigate the impact of the wind.

In some embodiments, a wind detection system can detect high wind conditions based on the movement of nearby vehicles. For example, data from one or more vehicle sensors can be used by the wind detection system to identify the side-to-side movement of nearby vehicles being "pushed" or "buffeted" by the high wind conditions. When this type of vehicle movement is detected, the wind detection system can rank the severity of the wind condition based on the magnitude of the movement of nearby vehicles.

While various embodiments of the present disclosure are described herein, it should be understood that they are presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the described exemplary embodiments, but should be defined only in accordance with the following claims and their equivalents. The description herein is presented for the purposes of illustration and description. It is not intended to be exhaustive or to limit the disclosure to the precise form disclosed. Many modifications and variations are possible in light of the disclosed teaching. Further, it should be noted that any or all of the alternate implementations discussed herein may be used in any combination desired to form additional hybrid implementations of the disclosure.

The invention claimed is:

1. A method comprising:
   receiving, by a wind detection system, sensor data from a sensor mounted to a vehicle the sensor being a LIDAR (light detection and ranging) sensor;
   receiving, by the wind detection system, images from a camera mounted to the vehicle;
   receiving, by the wind detection system, pitch and yaw data from at least one of an accelerometer and a gyroscope;
   detecting particles around the vehicle by using the sensor data and the images;
   receiving, by the wind detection system, map data associated with the vehicle's current geographic location;
   receiving, by the wind detection system, weather data associated with the vehicle's current geographic location;
   determining, by the wind detection system, a wind condition near the vehicle based on fusion of the sensor data, the images, the pitch and yaw data, the map data, and the weather data;

responsive to determining that the wind condition near the vehicle is severe, determining, by the wind detection system, a best action to avoid or mitigate wind-caused impact on the vehicle; and implementing, by the wind detection system, the best action.

2. The method of claim 1, wherein the vehicle further includes a radar sensor.

3. The method of claim 1, wherein the best action to avoid or mitigate the wind-caused impact on the vehicle includes at least one of reducing a speed of the vehicle, parking the vehicle near natural windbreaks, maneuvering the vehicle close to man-made windbreaks, and positioning the vehicle to face a wind.

4. The method of claim 1, further comprising generating audible or visual warnings regarding the wind conditions.

5. The method of claim 1, further comprising reporting the wind conditions to other nearby vehicles.

6. The method of claim 1, wherein the vehicle is an autonomous vehicle.

7. An apparatus comprising:

a plurality of sensors mounted to a vehicle and configured to capture sensor data, the plurality of sensors including a light detection and ranging (LIDAR) sensor, a radio detection and ranging (RADAR) sensor, a camera, an accelerometer, and a gyroscope; and a wind detection system coupled to the sensor and configured to receive and analyze the sensor data from the plurality of sensors and fuse the sensor data from all of the plurality of sensors to identify airborne particles near the vehicle, the wind detection system further configured, responsive to identification of airborne particles, to:

determine a wind speed and wind direction based on movement of the airborne particles;

determine a best action to avoid or mitigate a wind-caused impact on the vehicle; and implement the best action.

* * * * *